United States Patent
Hantschel

(10) Patent No.: US 9,118,212 B2
(45) Date of Patent: Aug. 25, 2015

(54) SOLAR INVERTER FOR AN EXTENDED INSOLATION RANGE AND OPERATING METHOD

(71) Applicant: Jochen Hantschel, Dettingen (DE)

(72) Inventor: Jochen Hantschel, Dettingen (DE)

(73) Assignee: REFUSOL GMBH, Metzingen (DE)

( * ) Notice: Subject to any disclaimer, the term of this patent is extended or adjusted under 35 U.S.C. 154(b) by 318 days.

(21) Appl. No.: 13/621,508

(22) Filed: Sep. 17, 2012

(65) Prior Publication Data
US 2013/0062942 A1 Mar. 14, 2013

Related U.S. Application Data

(63) Continuation-in-part of application No. PCT/EP2011/054560, filed on Mar. 24, 2011.

(30) Foreign Application Priority Data

Mar. 25, 2010 (DE) .......................... 10 2010 016 138

(51) Int. Cl.
*H02J 1/00* (2006.01)
*H02J 7/35* (2006.01)
*H02J 3/38* (2006.01)

(52) U.S. Cl.
CPC .. *H02J 7/35* (2013.01); *H02J 3/383* (2013.01); *Y02E 10/563* (2013.01); *Y02E 10/566* (2013.01); *Y10T 307/313* (2015.04)

(58) Field of Classification Search
USPC .......................................................... 307/19
See application file for complete search history.

(56) References Cited

U.S. PATENT DOCUMENTS

| | | | | |
|---|---|---|---|---|
| 4,636,931 | A | * | 1/1987 | Takahashi et al. ............... 363/71 |
| 7,957,168 | B2 | * | 6/2011 | Zacharias et al. ............. 363/132 |
| 8,482,947 | B2 | * | 7/2013 | Chapman et al. ............... 363/71 |

(Continued)

FOREIGN PATENT DOCUMENTS

| | | |
|---|---|---|
| DE | 100 18 493 A1 | 10/2001 |
| DE | 100 18 943 A1 | 10/2001 |

(Continued)

OTHER PUBLICATIONS

Paper by G. Wirth, et al. entitled "Sizing and Operational Experience With MWp PV-Systems Lessons Learned for System Design Tasks" published by Siemens dated.

(Continued)

*Primary Examiner* — Rexford Barnie
*Assistant Examiner* — Daniel Kessie
(74) *Attorney, Agent, or Firm* — R. S. Lombard; K. Bach

(57) ABSTRACT

An inverter system (1) for a photovoltaic solar installation for generating an AC voltage from a DC voltage of a solar generator (2) is provided which includes an additional energy storage device (38) which is arranged in an energy transfer path that can be activated when needed. A control arrangement (31, 39) for monitoring and controlling the operation of the inverter system (1) is designed to detect short-term energy peaks of the insolation at the solar generator and, upon a presence of insolation peaks, to activate the energy transfer path (36) in order to cause a transfer of energy from the solar generator (2) to the energy storage device (38). Also a method for the operation of an inverter system for a photovoltaic solar installation for the utilization of insolation peaks at the solar generator is disclosed.

16 Claims, 4 Drawing Sheets

(56) References Cited

U.S. PATENT DOCUMENTS

| | | | |
|---|---|---|---|
| 8,643,323 B2* | 2/2014 | Bakas et al. | 320/101 |
| 2007/0291522 A1* | 12/2007 | Toba et al. | 363/132 |
| 2009/0086520 A1 | 4/2009 | Nismimura | |
| 2009/0283129 A1 | 11/2009 | Foss | |
| 2010/0008119 A1 | 1/2010 | O'Brien et al. | |
| 2011/0298292 A1* | 12/2011 | Bremicker et al. | 307/82 |

FOREIGN PATENT DOCUMENTS

| | | | |
|---|---|---|---|
| DE | 100 20 537 A1 | 12/2001 | |
| DE | 102 21 592 A1 | 12/2003 | |
| DE | 10 2005 024 465 A1 | 11/2006 | |
| EP | 1 369 985 B1 | 12/2003 | |
| EP | 2 200 152 | * 6/2010 | H02J 7/35 |

OTHER PUBLICATIONS

English Translation of DE 100 20 537 A1 Abstract by the Daub Law Firm.
1st page of WO 2007/003241 A1 with an English Abstract.
German Office Action in re: DE 10 2010 016 138 A1 in German.
Partial English Translation of German Office Action in re: DE 10 2010 016 138 A1 by the Daub Law Firm.
English Translation of DE 100 18 493 A1 Abstract by the Daub Law Firm.
International Search Report in English regarding the corresponding PCT application PCT/EP2011/054560.
International Preliminary Report on Patenability of Sep. 25, 2012 in German regarding the corresponding PCT application PCT/EP2011/054560.
English Translation of the Written Opinion of the International Searching Authorigy regarding the corresponding PCT application PCT/EP2011/054560.
Australian Office Action of Nov. 26, 2013 corresponding to PCT application PCT/EP2011/054560.
Bodach; "Energiespeicher im Niederspannungsnetz zur Integration dezentraler fluktuierender Energiequellen", Dissertation, Technische Universit. Chemnitz, Jun. 30, 2006, Germany.
Reuning; "Sonnenstrom aus dem Sixpack", broadcast Deutschlandfunk (German radio station), Sep. 24, 2007, Germany.
English abstract: Reuning—"Solar Pack from the six-pack" contribution from Deutschlandfunk (German radio station) of Sep. 24, 2007, imprint from the archive of the station.
Zeitschrift Echo, "Sonnenstrom aus dem Sixpack", Echo online magazine, Sep. 19, 2007.
Glavin, "A stand-alone photovoltaic supercapacitor battery hybrid energy storage system", 13th Power Electronics and Motion Control Conference, 2008, IEEE, S. 1688-1695.
Wikipedia article, "Maximum power point tracking", published version Feb. 7, 2010.
Takashima et al, "Maximum output control of photovoltaic (PV) array", 35th Energy Conversion Engineering Conference, vol. 1, 2000, IEEE, p. 380-383.
Enrique et al.; "A reliable fast and low cost maximum power point tracker for photovoltaic applications", Solar Energy, vol. 84, 2010, p. 79-98, available online, Nov. 14, 2009.
Salas et al.; "Review of the maximum power point tracking algotrithms for stand-alone photovoltaic systems", Solar Energy Materials and Solar Cells, vol. 90, 2006, p. 1555-1578.
Esram et al., "Comparison of photovoltaic array maximum power point tracker techniques", IEEE transactions on energy conversion, vol. 2, No. 2, Jun. 2007, p. 439-449.
Wikipedia, "Regelkreis", Mar. 24, 2010, 25 pages.
English Version Wikipedia article "control system", published version of Mar. 24, 2010.
Chen et al.; "A cost-effective single-stage inverter with maximum power point tracking", IEEE transactions on power electronics, vol. 19, No. 5, Sep. 2004, p. 1289-2004.
Casadei et al.; "Single-phase single-stage photovoltaic generation system based on a ripple correlation . . . ", IEEE trans. power elect., vol. 21, No. 2, Jun. 2006, p. 562-568.
Jain et al.; "A Single-Stage Grid Connected Inverter Topology for Solar PV Systems With . . . ", IEEE trans. power elect., vol. 22, No. 5, Sep. 2007, p. 1928-1940.
Wirth et al.; "Sizing and Operational Experience . . . ", university of applied sciences Munick, Siemans AG, 24th European Photovoltaic Solar Energy Conf. Hamburg 2009,p. 4185-4188.
German Office Action of Dec. 15, 2014, in re: DE 10 2010 016 138.1.
Partial English Translation of German Office Action of Dec. 15, 2014 in re: DE 10 2010,016 138.1 by the Daub Law Firm.
Chinese Office Action of Sep. 10, 2014, in re: 201180025677.5.
Partial English Translation of Chinese Office Action of Sep. 10, 2014, in re: 201180025677.5 by the Daub Law Firm.
Bodach: Abstract in English—"energy store in low voltage system for integration of decentral fluctuating energy sources", Technical University Chemnitz Jun. 30, 2006.
English abstract: magazine Echo, "Solar power from the six-pack", Sep. 19, 2007, print of the online-edition.
Partial English translation of the German Wikipedia article "RegelKreis" published version Oct. 15, 2014.

* cited by examiner

SOLAR INVERTER FOR AN EXTENDED INSOLATION RANGE AND OPERATING METHOD

CROSS-REFERENCE TO RELATED APPLICATION

This is a continuation-in-part application of pending international application PCT/EP2011/054560 filed Mar. 24, 2011 and claiming priority of German Patent Application No. 10 2010 016 138.1 filed Mar. 25, 2010.

BACKGROUND OF THE INVENTION

The invention resides in a solar converter for a photovoltaic solar system and an operating method therefore, in particular a solar inverter with a corresponding operating method for an extended insolation value range.

Converter systems for photovoltaic solar plants for connection to a solar energy generator and to convert the DC voltage of the solar generator to a single or multiphase AC voltage are known in various configurations. In a common configuration they include an intermediate circuit, which is to be connected to the solar generator and one or several capacitors for storing energy, possibly a voltage amplifier arranged between the solar generator and the intermediate circuit to bring the voltage of the solar generator to a required higher level, as well as an inverter which is connected to the intermediate circuit and whose output can be connected to an AC voltage network for supplying energy to one or more consumers for supplying energy thereto. Generally electronic converter arrangements with semi- or full bridge circuits are used which include controllable semiconductor switching elements and which can be controlled by a controller and a control arrangement at high frequency so as to generate an output AC current which, with respect to its phase and amplitude, is adapted to a semi-shaped 50 Hz or 60 Hz network voltage. Configurations of solar inverter systems and corresponding operating methods are, for example, described in DE 102 21 592 A1 DE 100 20 537 A1 and DE 10 2005 024 465 A1.

Solar generators for photovoltaic installations include generally several solar modules arranged in series and, if appropriate, parallel circuits, whose solar cells convert incoming light of the sun directly to electrical energy. The inverter then uses this energy to generate the AC current suitable for the network or the consumer. The inverter needs to operate with high efficiency in order to achieve a high yield. These factors are extremely important in view the relatively high investment expenses for the installation and the operation of a photovoltaic plant. Modern inverter systems may achieve an overall efficiency of up to 98% or even more when operating at rated conditions.

In order to achieve the highest possible yield, the solar generator is operated at the so-called Maximum Power Point (MPP) which is that point of the current-voltage-diagram of the solar generator where the highest energy output can be achieved that is where the product of current and voltage is at a maximum. The MPP operating point is not constant, but depends on the light radiation density, the temperature and the type of the solar cells or, respectively, the solar generators.

MPP operating point is adjusted in a solar inverter often by a so-called MPP-tracker which controls the voltage of the solar generator to the needed value. To this end, the MPP-tracker varies, for example, the current withdrawn by a small amount, calculates the respective product of current and voltage and adjusts the current value toward a higher energy output. As a result, the correct energy output adaptation can be provided even with changing insolation conditions at the solar generator.

However, the converters are usually not designed for the whole light radiation range. Often inverters are used which have a design performance which is about 10% below the maximum energy output of the solar generator. The reasons herefor are that smaller converters are less expensive and have a substantially higher efficiency under partial load conditions. With the light radiation values as prevalent in central Europe, a partial load operation in the area of about 10% to 80% of the rated solar generator output is obtained. Therefore the inverters are designed conventionally only for radiation energy values of up to about 1000 w/m².

However, weather conditions where the insolation values are higher so that the solar generator produces energy, which the conventionally dimensioned inverter can not accommodate, will also occur. For example, with low ambient temperatures and cloud formations, for short periods, enhanced by reflections on the clouds, high insolation values of up to 1400 w/m² or more can occur which cause maximum peak energy outputs of the solar generator. A study of G. Wirth, M. Zehner, B. Giesler: "Sizing and Operational Experience with MWp-PV-Systems-Lessons Learned for System Design Tasks", 2009 estimates the energy of these radiation peaks which are in the range of 1000 to 1400 W/m² to be up to 8% of the annual energy yield.

Generally with such an excess insolation yield, exceeding the performance limit of the converter, the MPP operating point is moved toward a higher voltage. However, because the under-dimensioned inverter can not accommodate the excess energy yield, it keeps the operating point at values corresponding to its performance maximum whenever the maximum energy yield exceeds the capacity of the inverter. As a result, part of the energy the solar generator could deliver is not utilized and is lost.

In order to avoid this, the above-mentioned study of G. Wirth et. al., recommends not to under-dimension the inverter relative to the solar generator, as it is common practice, but rather to over-dimension it, for example to 110% inverter capacity in relation to 100% solar generator energy output. Such a set-up however has several disadvantages: First, as mentioned earlier, the inverter becomes more expensive with increasing size and capacity. Second, under normal operation with partial load, for example at 10% of the generator rated energy output, the conversion efficiency is detrimentally affected. Finally, a network or consumer which could accept the peak energies is often not available.

Based hereon, it is an object of the present invention to provide a solar inverter system and an operating method which overcomes the disadvantages of the known inverter systems and to better utilize the performance peaks of the light radiation. In particular, it is an object of the present invention to provide a inverter system which is suitable for an extended insolation value range without the disadvantages of an inverter over dimensioning. Advantageously, the overall efficiency of the inverter should be increased with varying insolation conditions.

SUMMARY OF THE INVENTION

The object is fulfilled by an inverter system with the features of claims. The invention provides an inverter system (1) for a photovoltaic solar installation for generating an AC voltage from a DC voltage of a solar generator (2) which includes an additional energy storage device (38) which is arranged in an energy transfer path that can be activated when needed. A control arrangement (31, 39) for monitoring and controlling the operation of the inverter system (1) is designed to detect short-term energy peaks of the insolation at the solar generator and, upon a presence of insolation peaks, to activate the energy transfer path (36) in order to cause a transfer of energy from the solar generator (2) to the energy storage device (38). In this way, the excess insolation amount can be preliminarily buffered during insolation peaks and later used for covering the energy use of the inverter (4) of for feeding secondary consumers, which increases the efficiency or the yield of the solar installation. Also a method for the operation of an inverter system for a photovoltaic solar installation for the utilization of insolation peaks at the solar generator is disclosed.

In accordance with an aspect of the invention, an inverter system for a photovoltaic solar plant for generating an AC voltage from a DC voltage of a solar generator wherein the inverter system comprises an intermediate circuit with DC voltage branches connectable to the solar generator and at least one storage means, in particular a capacitor for the interim storage of energy of the solar generator and an inverter for converting an intermediate circuit DC voltage present between the DC voltage branches into an inverter output side DC voltage wherein the inverter is connected to the intermediate circuit, in particular parallel to the at least one storage means of the intermediate circuit. Furthermore, an additional energy storage device separate from the, at least, one energy storage means is provided for accommodating excess energy from the solar generator. The energy storage device is disposed in an energy transmission path which can be selectively activated and which is connected so as to extend between the DC voltage branches. The inverter system further includes a control arrangement for supervising and controlling the operation of the inverter system. In accordance with the invention, the control system is so designed that it can detect and evaluate at least one which characterizes the momentary insolation energy at the solar generator and that if this energy value exceeds a predeterminable limit the energy transmission path is activated so as to effect a transmission of energy from the solar generator to the energy storage-device.

Consequently, the solar inverter is provided at its input side at the DC voltage intermediate circuit with an additional arrangement which includes essentially the energy storage device and a control logic wherein the additional arrangement is capable to transfer, for a short period, a part of the solar generator energy to the energy storage device. In this way, it is ensured that also in case of a short-term excessive insolation that is during insolation peaks no operating point change is necessary at the solar generator even with an inverter of limited capacity. As a result, the solar generator can continue to operate at its MPP point while its full useable energy is not lost even during insolation peaks, but is actually utilized. The additional arrangement according to the invention makes it possible to utilize the insolation parts, of for example above 1000 w/m$^2$, which so far could not be utilized or only with substantial expenditures. This is achieved without over dimensioning of the inverter and, preferably with an under-dimensioned inverter.

Preferably, the inverter system is designed and used for feeding energy into an AC power supply system in particular a public power supply system. The inverter accordingly supplies at its output an AC current adapted to the power supply system AC voltage. But any consumer may be connected to the output of the inverter.

The inverter may principally be of any design and may or may not include a transformer. Preferably, the inverter has no transformers, but includes an inverter bridge circuit or respec-tively, a semi- or full bridge with switchable semiconductor switching elements which are switched particularly by pulse width modulation in order to generate the output ac voltage. Depending on needs, the inverter may be in a one- to three phase configuration.

The energy storage device is specifically selected and designed so that it can accommodate the short-term excessive energy supply provided with the insolation peaks. The energy storage device is preferably capable of receiving for a short period of at least 5 to 60 seconds or 5 to 90 seconds up to 40% or even 50% of the rated inverter performance. A high energy storage capacity of the energy storage device for a short period is here very important, more than the efficiency of the energy storing process. Important is also a low self-discharge whereas a long-term storage capability is of less importance in connection with the energy storage device according to the invention. As storage devices so called super capacitors are particularly suitable, that is electro-physical or electro-chemical capacitors as they are known under the designations Supercap, Boostcap or Ultracap. Also electrolyte capacitors may be used. Other storage technologies such as lithium ion accumulators or similar may be used in connection with future improvements regarding the charging circuits.

Preferably, the energy storage device includes a voltage converter or DC/DC controller. In this way, the voltage of the solar generator can be converted, in particular reduced, to a voltage level which is suitable for the utilization of the energy storage device independently of the design and set up of the solar generator. The voltage converter may also be bi-directional voltage amplifier or reducer which makes it possible, in a simple manner to transmit energy from the energy storage device to the intermediate circuit when necessary.

The energy transmission path may include at least one switching means which is activated or controlled by the control arrangement in order to selectively activate or deactivate the energy transmission path. In an advantageous embodiment, the at least one switching means part of the bi-directional amplifier a reducer and can be controlled so as to transmit energy to the energy storage device or from the storage device to the intermediate circuit.

The control arrangement according to the invention is particularly provided for detecting insolation peaks and to control the operation dependent thereon. In a particularly advantageous embodiment of the invention the control arrangement includes a measuring arrangement in the form of an insolation sensor which directly detects the insolation performance preferably in the immediate proximity of the solar generator and supplies the measured value to the control arrangement. The control arrangement includes a comparison arrangement which receives the momentary insolation value and compares it with a threshold value which may be provided as a limit value in order to determine whether the conditions of insolation peaks are present. If it detects such a condition that is if the momentary insolation value is greater than the threshold value the control arrangement initiates an energy transmission to the energy storage arrangement.

The threshold values is an adjustable setting reference value which is preferably in the range of about 900 to about 1100 w/m$^2$ (watts per square meter). 1000 w/m$^2$ corresponds to the insolation value which is used as a standard under laboratory conditions at 25° C. cell temperature, 90° impingement angle and further conditions for defining peak or, respectively rated performance of a solar module or, respectively, generator. The threshold value, however, may also be set differently depending on the design of the inverter, in particularly, its performance rating or maximum power output.

In a further embodiment of the invention, the control arrangement for determining conditions which characterize insolation peaks is designed to recognize a full load of the inverter by its output maximum. When the control arrangement detects such a full load of the inverter it initiates an energy transfer to the energy storage device so as to utilize the energy part of the solar generator which exceeds the limit value of the maximum inverter capacity.

In an actual embodiment the control arrangement includes a conventional control circuit with an MPP-tracker arrangement, a voltage controller, a limiting arrangement and a current controller. The MPP-tracker arrangement sets a desired performance value for the inverter by making the solar generator operate at the MPP operating point, The limiting arrangement limits when necessary the desired output to a maximally acceptable value. The controls control the voltage applied to the intermediate circuit or, respectively, the AC current to be generated.

A simple and advantageous possibility for recognizing a full utilization of the inverter in order to determine conditions characterizing insolation peaks resides in the delimitation when the desired power output as set by the MPP-tracker arrangement reaches the limit. In this case, the limiting arrangement delimits the desired power output to the maximally acceptable value and it reports this condition to the control arrangement whereupon, for example, the MPP-tracker arrangement is stopped. If the control arrangement is, for example, based on a microprocessor or similar, the limiting arrangement may set a respective power limit bit in a register or similar. As long as the power limit bit is set, the MPP-tracker arrangement remains stopped and the energy storage device is charged.

It is also possible to provide other measuring arrangements at the DC voltage side as well as at the AC voltage side of the inverter to obtain alternatively or additionally a full utilization of the inverter at its maximum performance and consequently to recognize short term conditions characteristic of insolation peaks.

Preferably, the control arrangement is further designed, to determine the energy amount to be transferred to the energy storage device. The control arrangement may determine on the basis of predeterminable parameters and actual ambient conditions of the inverter system such as the maximum power output and/or the efficiency of the inverter, the generator characteristic possibly taking into consideration the temperature coefficients the energy amount limit which the inverter is capable of feeding into the power network or the consumer in order calculate the exact energy amount which is in excess of the load limit which then is supplied to the energy storage device.

The control arrangement also decides when the buffering should be ended. When, for example, the generator output falls below the load that can be accommodated by the inverter the control arrangement de-activates the energy transfer path so as not to divert energy from the solar generator to the storage device so that all its energy is supplied to the dc intermediate circuit. The threshold for switching off the buffering may be slightly below the rated generator performance.

With the inverter system according to the invention, the presence of insolation peaks can be recognized and, for a short period, such an amount of energy can buffered with the energy storage device, than the operating point for maximum power output (MPP-point) of the solar generator can be maintained wherein the inverter is operated at rated or maximum capacity. In this way, the full amount of energy generated by the solar generator is utilized. The overall efficiency of the inverter is substantially increased under varying insolation conditions. And this is achieved with relative simple and inexpensive means. With an embodiment based on an insolation sensor, the additional arrangement which comprises the insolation sensor, the switching arrangement, possibly means for adaptation of the voltage, the energy storage device and the control components for controlling the storing of the energy may be in the form of a separate auxiliary device which could also be installed in existing inverter systems in a simple manner. Alternatively or additionally, a logic reorganizing the full utilization of the inverter may be integrated into the inverter itself, or in the control arrangement thereof so that the inverter as such decides when and how much energy is buffered. In this case, an insolation sensor would not be necessary which reduces expenses further. However, an insolation sensor would still be very advantageous for recognizing short term insolation peaks.

Advantageously the energy buffered in the energy storage device can be recuperated and utilized. To this end, the control arrangement can connect the energy storage device selectively to the intermediate circuit and/or a consumer (load) for transmitting the energy from the energy storage device to the intermediate circuit and/or the consumer. For example, with a reduced solar generator performance below its rated performance level the stored energy may be supplied to the intermediate circuit so as to operate the inverter as close as possible at its rated power output and feed the buffered energy also into the network. This improves the performance of the photovoltaic plant. Alternatively, the energy obtained from the energy storage device may be used for satisfying the energy use of the inverter which would increase the average efficiency of the inverter and, consequently, increase the overall yield. Furthermore, this energy may be supplied to secondary consumers (such as ventilators, etc) also independently of the inverter.

In accordance with another aspect of the invention, a method of operating such an inverter system for a photovoltaic solar plant for generating an AC voltage from a DC voltage of a solar generator is provided, wherein the method includes the steps of providing an energy-storage device which can be connected to the solar generator for receiving energy therefrom and wherein conditions are determined which are characteristic for insolation conditions at the solar generator and, in case the conditions determined indicate insolation peaks at the solar generator which exceed the maximally usable insolation volume, a transfer of energy from the solar generator to the energy storage device is initiated from a transient storage of energy, while the inverter is operated at its rated or maximum performance level. The description presented in connection with the inverter system according to the invention concerning the advantageous effects and variations apply correspondingly also to the method according to the invention.

BRIEF DESCRIPTION OF THE DRAWINGS

Further features and advantageous embodiments of the invention are apparent from the drawings, the description and the claims. The drawings show only exemplary embodiments of the invention, but should not be considered to be limiting in any way. It is shown in:

DETAILED DESCRIPTION OF THE PARTICULAR EMBODIMENTS

Figure 1:
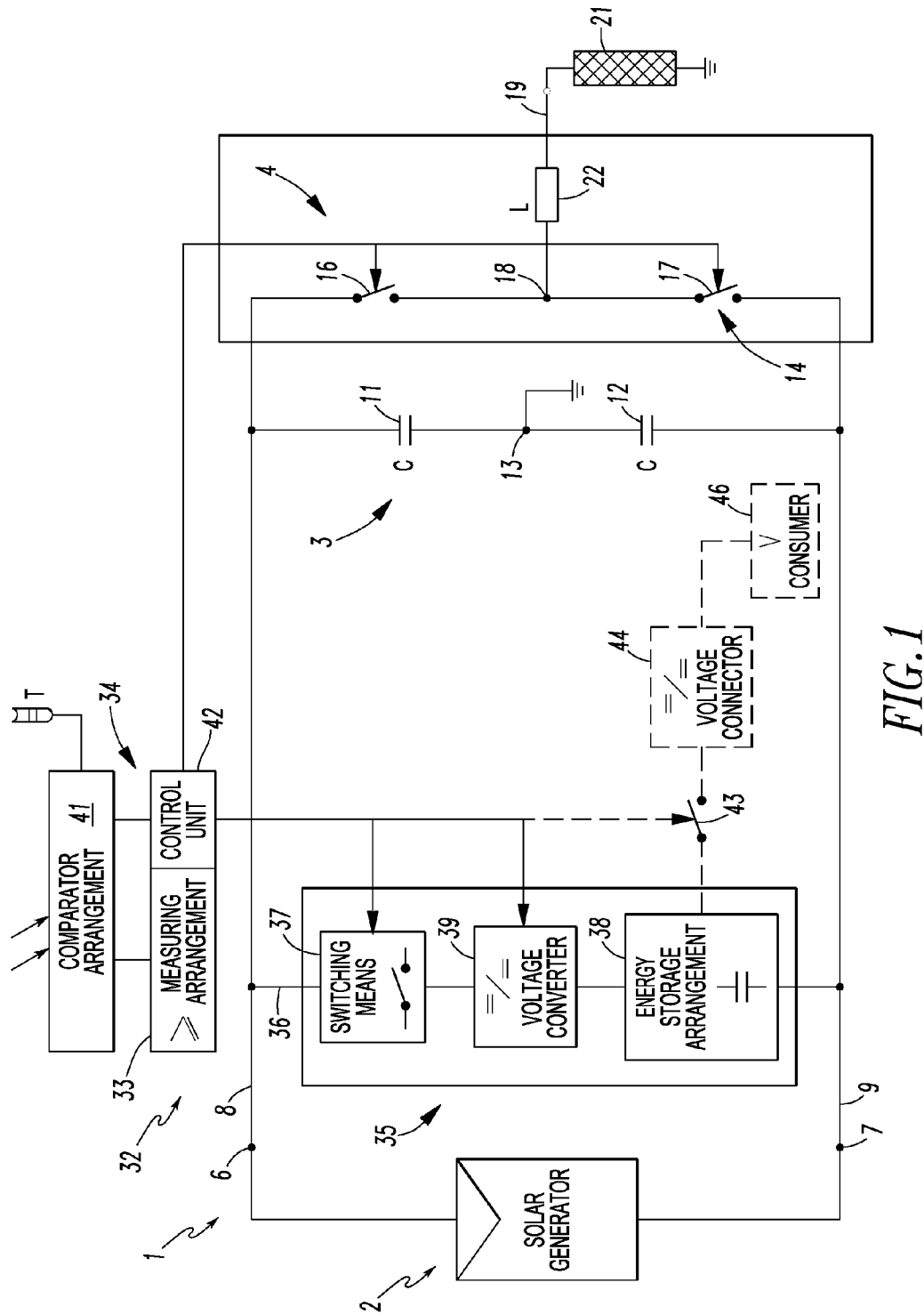
FIG. 1 a particular embodiment shown in principle an inverter system according to the invention.

FIG. 1 shows an inverter system according to the invention which is provided for a photovoltaic solar panel for generating an AC voltage from a DC voltage. To this end, the shown inverter system 1 includes in a known way a solar generator 2, an intermediate circuit 3 connected to the solar generator, and an inverter 4 connected to the intermediate circuit.

The solar generator 2 comprises one or several solar modules, not shown, which convert insolating light into electrical energy. The solar generator 2 has electrical connections which are connected to a positive and a negative DC voltage connector 6, 7 of the inverter system 1. From the DC connectors 6, 7, DC voltage branches 8, 9 extend to the intermediate circuit 3 and to the inverter 4.

The intermediate circuit 3 in this case consists of two capacitors 11, 12 which are connected in series between the DC voltage branches 8, 9. The capacitors 11, 12 preferably have the same size so that they are both subjected to the same voltage, which is essentially half the generator voltage. The connecting point 13 between the capacitors 11, 12 is then preferably grounded, as this is shown in FIG. 1. The intermediate circuit 3 however may also include only a single capacitor or even several capacitors, which serve as storage means for storing energy which is supplied to the inverter 4.

Although it is not shown in FIG. 1, a voltage amplifier 3 or a DC-DC converter 7 may be disposed in the intermediate circuit 3 whereby the input voltage level provided by the solar generator is adapted to the output voltage needed at the output of the inverter.

The inverter 4 is provided to convert the DC voltage present at the intermediate circuit to an outlet ac voltage. The inverter 4 is connected to the DC voltage branches in parallel with the capacitors 11, 12. Here the inverter 4 has the form of a semi-bridge 14 with two controllable switching elements 16, 17 which are preferably semi-conductor switches in the form of IGBT—or MOS-FET or other low-loss switches, which can be switched in a pre-determinable way at high frequencies of, for example 20 kHz. The connecting point between the switching elements 16, 17 forms the center contact area 18 of the AC voltage that is an AC voltage-side output of the inverter 4, which is connected to an AC voltage branch 19. The ac voltage branch 19 is connected for example to an AC voltage power supply system 21 and/or one or several consumers. The AC voltages output side of the inverter includes in the AC voltage branch 19, a storage throttle 22, e.g., an inductor and possibly other filter elements such as filter capacitors or similar which, for simplicity reasons are omitted here.

Although in FIG. 1 an inverter 4 of a semi-bridge design with center connectors is shown, this arrangement is only exemplary for an inverter. The inverter 4 could also be of full bridge design. Such inverters as well as other inverters are widely used in technical applications and their designs and functioning are generally known. Also, for explanation purposes only, a single phase inverter 4 is shown herein, but for feeding a three phase power supply network it may also be in a three-phase configuration.

When the inverter system 1 is used to feed energy, for example, into a public power supply network an AC voltage is present between an AC voltage connection (not indicated) of the AC voltage branch 19 and another connection which in this case is connected to ground and which has an amplitude of about √2-230V and a frequency of 50 or 60 Hz. Furthermore, via each of the capacitors 11, 12 of the intermediate circuit 3 about half the voltage of the solar generator 2 is present between the DC voltage branch 8, 9 and the connecting point 13. During operation a control arrangement controls in accordance with a certain switching pattern, for example, on the basis of pulse width modulation, the switching elements of the inverter 4 in a suitable manner so that, based on the intermediate circuit DC voltage at the input of the inverter 4, an output AC voltage is provided at the output of the inverter 4 which corresponds essentially to the phase position and amplitude of the network AC voltage.

Figure 2:
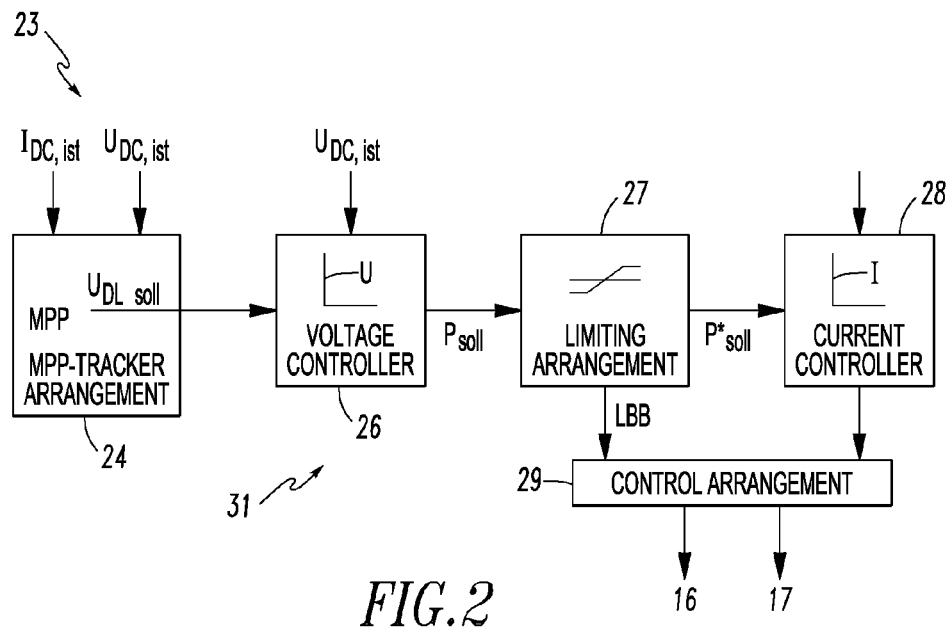
FIG. 2 a circuit representing a control unit of the control arrangement of an inverter system according to the invention.

For a stable operation the input energy supplied by the solar generator 2 at the input side of the inverter and the AC voltage side output energy of the inverter 4 which is fed into the network 21 should be equalized. The available DC voltage energy depends on the ambient conditions such as insolation, temperature, insulation and the solar generator voltage. The inverter should always be controlled to a voltage of the solar generator characteristic line which corresponds to the operating point with the momentary highest energy yield that is the Maximum Power Point (MPP). This is achieved by a control arrangement 23 associated with the inverter system 1 as it is shown in FIG. 2 in a simplified manner.

The control arrangement 23 includes a MPP-tracker arrangement 24 which adjusts the operating point of the solar generator 2 always for optimum power generation in such a way that the generator 2 provides the highest possible power output available with the momentary insolation conditions. The MPP-tracker arrangement 24 obtains to this end the actual values $I_{DC, ist}$, $U_{DC, ist}$ of the momentary input DC current and the momentary input DC voltage and determines therefrom the desired value of the AC output power P desired which is to be fed to the AC voltage power supply system 21. A voltage controller 26 controls the input voltage to the required value. This desired input power value $P_{soll}$ is supplied to a limiting arrangement 27 which when necessary limits the desired value to a maximum corresponding to the maximum value of the output power of the inverter at full load. A subsequent AC current controller 28 controls the AC current to the value needed to obtain the desired value $P_{soll}$ as it is indicated to be desired at the output of the limiting arrangement 27. A control arrangement 29 uses the information from the current controller 28 for determining switching thresholds for the switching elements 16, 17 of the inverter semi-bridge 14 and controls it in a pulse-width modulated manner in order to obtain the ac current as determined by the current controller. The control arrangement 23 with the components 24 to 28 and the control arrangement 29 form together a supervisory control 31 which controls the total operation of the inverter system 1.

The inverter system 1 according to the invention is designed in particular also for the utilization of short term insolation peaks in connection with photovoltaic installations. As a result of cloud concentration effects insolation peaks may occur lasting for short periods of a few seconds up to about one or a few minutes and which exceed the rated nominal insolation of 1000 W/m² for which the photovoltaic plants are generally designed. The inverter system 1 according to the invention is designed to utilize the insolation, i.e., without the need for over dimensioning the inverter 4 and without the disadvantage associated therewith so that the overall efficiency of the inverter during charging insolation conditions can be increased.

To achieve this, the embodiment of the inverter as shown in FIG. 1 includes an additional arrangement 32 for utilizing the energy of insolation peaks. The additional arrangement 32 comprises a measuring arrangement 33 which senses the momentary insolation and, if appropriate, also the ambient— and module temperature T of the solar generator 2, a control component 34 and a storage component 35. The measuring arrangement which includes the insolation sensor is preferably arranged directly at the solar generator but it may also be arranged at a remote reference location. The storage component 35 is arranged in an energy transmission path 36 which can be activated and which extends parallel to the solar generator 2 between the DC voltage branches 6, 7 at the DC voltage input side of the inverter 4. The storage component 35 includes a switching means 37, an energy storage arrangement 38, and optionally a voltage converter 39 which is arranged here between the switching means 37 and the energy storage arrangement 38. The switching means 37 can be operated or, respectively controlled by the control component 34 in order to activate the energy transmission path 36 for storing energy in the energy storage device 38. The switching means 37 could for example connect the input of the voltage converter 39 or, respectively, the energy storage device 38 with the position DC voltage branch 8. The other connection of the energy storage device 38 is connected to the negative DC voltage branch 9. The switching means 37 may also be part of the voltage converter 39 as this is described below in connection with FIG. 4.

The voltage converter 39, also called DC/DC controller, converts, when needed the voltage potential present at the DC voltage branch 8 to a voltage level suitable for the energy storage device 38. Generally, the voltage of the solar generator 2 is reduced by the voltage converter 39 acting as a reduction controller to a lower level which can be tolerated by the energy storage device 38 during charging.

The energy storage device 38 is in this case a storage means which, within a short time of for example 5 to 60 seconds accepts about 0-30% or even 0-50% of the rated power of the inverter 4. For this purpose in particular, electric double layer capacitors are suitable which are also called super capacitors or Supercaps or, respectively Ultracaps. They can be changed rapidly and have a high capacity.

The control compartment includes an evaluation unit 41 and a control unit 42. The evaluation unit 42 is designed for evaluating the momentary insolation values as measured in order to detect conditions which characterize a short term insolation peak. In the most simple case, the evaluation unit 41 may include a comparator which compares the momentary value of the insolation energy with a predetermined threshold value, for example, the rated energy value of 1000 W/m² and when the threshold value is exceeded, determines that an insolation peak exists. Then the control unit 42 activates the energy transmission path 36 in order to transfer the desired energy amount to the energy storage device 38.

As a result, the additional arrangement 32 according to the invention recognizes the occurrence of an insolation peak and initiates the transfer of insolation energy of such an amount of energy from the generator connection 6 to the energy storage device 38 and its buffering there over the short period in which the insolation peak occurs that the MPP operating point of this solar energy generator 2 can be maintained during the insolation peak period. With the conventional procedure, upon occurrence of an insolation peak the MPP operating point is moved toward a higher voltage when the performance limit of the inverter is reached whereby however, the additional energy that could be delivered by the solar generator is not utilized but is lost. With the present invention, it is also possible to avoid an over-dimensioning of the inverter 4 in comparison with the solar generator 2 as well as the corresponding expenses and reduction of the partial load efficiency.

The control arrangement 34 also recognizes when insolation energy peak has ended. The comparator arrangement 41 recognizes, for example, the point in time when the momentary insolation energy becomes smaller then the pre-determinable threshold energy output. In this case, the control unit 42 deactivates the energy transfer path 36 again in order to discontinue the transfer of energy to the energy storage device 38.

The energy collected in the energy storage device 38 can be withdrawn as needed and used as operating current. As indicated in this respect in FIG. 1 by a dash-dotted line, the energy storage device 38 may be connected via a switch 43 and, for example, a voltage connecter 44 to a consumer 46 such as a fan for venting the inverter system 1 or as it may be connected with a consumer different from this invention in order to supply power to such a consumer when needed. The energy may also be used for use in the inverter 4 for increasing the average efficiency of the inverter and consequently the overall yield of the system. Alternatively, the additional energy may be supplied to the DC voltage intermediate circuit 3 when the solar generator operates below at lower energy output, below the rated energy output, and can be slowly also fed into the power supply network—which also increases the yield of the solar energy system. This can be achieved in a particularly simple manner if the voltage converter 39 of the additional arrangement is a bi-directional voltage reducer/amplifier which makes an energy transfer in both directions possible, that is also from the energy storage device 38 to the DC voltage branch 8.

The additional arrangement 32 as it is shown in FIG. 1 can be in the form of a separate external compartment which can be connected parallel to an existing inverter system to the DC voltage connections 6, 7 of the solar generator 2. However, it may also be integrated into an inverter 4 of the inverter system. Independently of the degree of integration the control component 34 which provides for an extended operating mode with the storing of energy in the energy storage device 38 upon the occurrence of insolation peaks, may be considered to be a part of the overall control 31 for controlling the operation of the inverter system 1.

Figure 4:
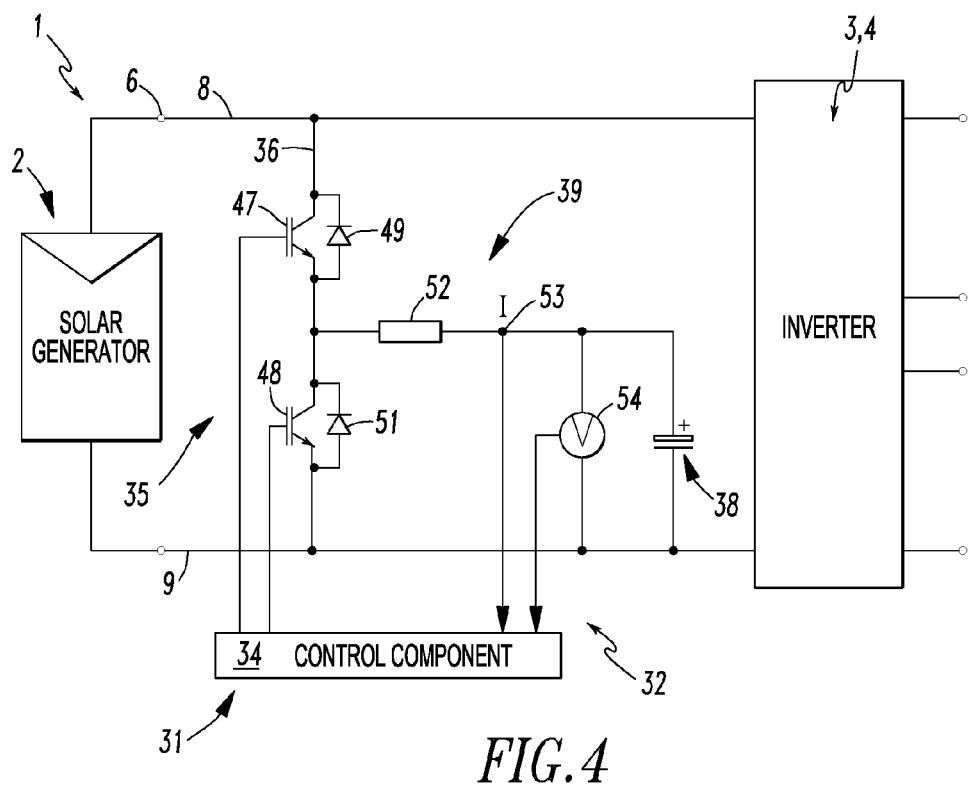
FIG. 4 a representation, in principle, of still another embodiment of an inverter system according to the invention; and, FIG. 5 a flow diagram of a method according to the invention for operating an inverter system according to the invention.
Figure 3:
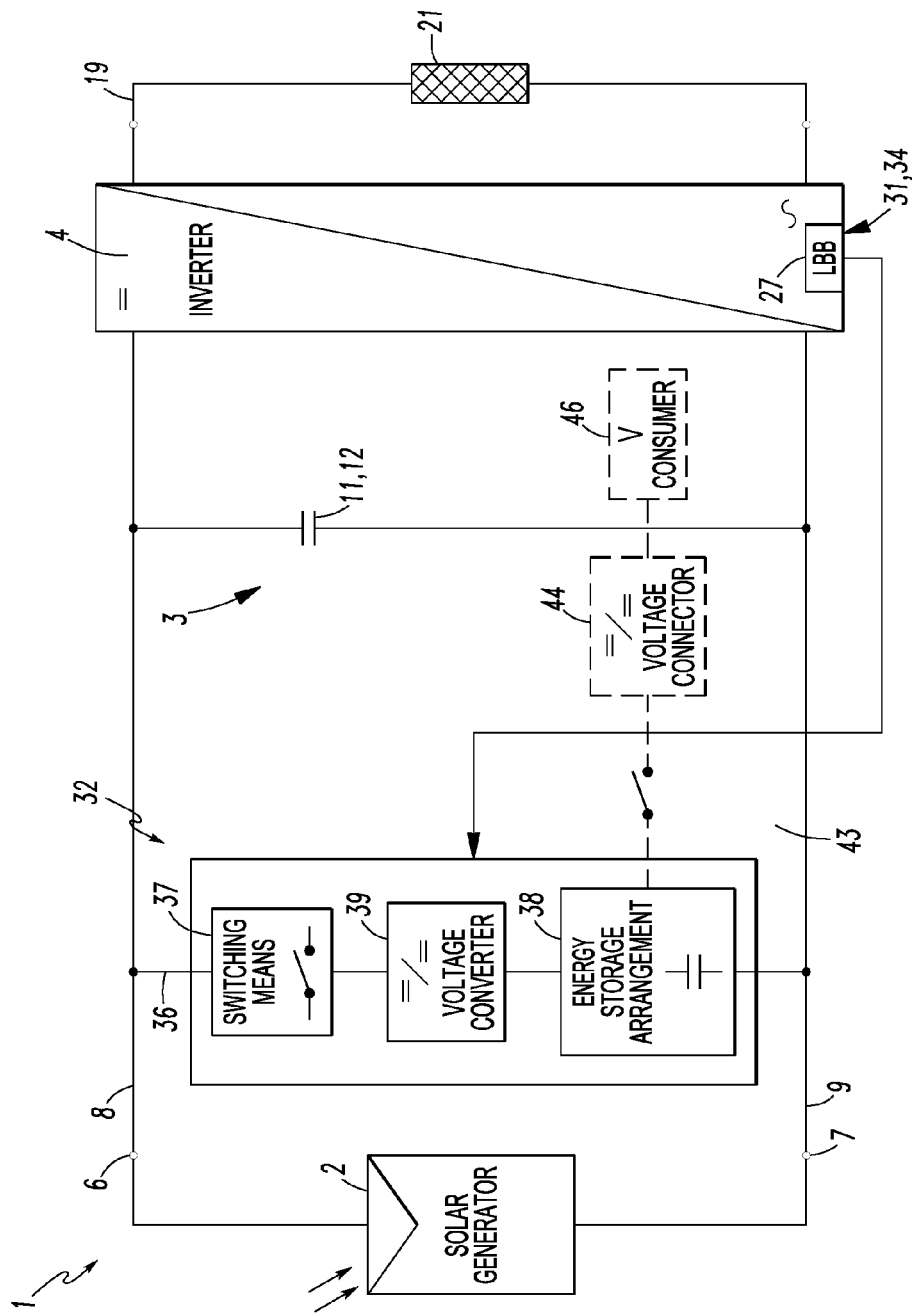
FIG. 3 a representation of another embodiment of the inverter system according to the invention.

FIGS. 3 and 4 show a modified embodiment of the invention. As far as it corresponds with the earlier described inverter system according to FIGS. 1 and 2 with regard to its set up and/or functioning reference is made to the earlier description by using the same reference numerals.

FIG. 3 discloses a further embodiment of an inverter system 1 into which the additional arrangement 32 for utilizing insolation peaks in the inverter system is integrated. Different from the embodiment according to FIG. 1, no sensor for detecting the insolation energy is provided herein. Instead the presence of insolation peaks is determined based on a full utilization of the inverter 4. As shown in FIG. 3, the control arrangement recognizes the full load of the inverter 4 by its AC side maximum power and then activates the energy transmission path 36 and as a result initiates the transfer of energy to the energy storage device 38. To this end, for example, as also shown in FIG. 2, the limiting arrangement 27 can set an energy limiting bit LBB when the desired value of the energy output $P_{soll}$ reaches the limit. Whereby, the control arrangement 29 of the control unit 3 signals a full load of the inverter 4.

As long as the power limiting bit LBB is set, the energy storage device 38 is charged whereas the MPP operating point of the solar generator 2 is maintained by means of the tracker arrangement 24 and the inverter 4 is operated at maximum performance. As soon as the desired value $P_{soll}$ is not limited any longer by the delimiting arrangement 27 the performance limiting bit LBB is again reset and the buffering of energy is terminated. The presence of the full utilization of the inverter 4 may otherwise also be reported to the control arrangement 29.

In any case, the embodiment shown in FIG. 3 makes it possible to provide a compact additional arrangement which is integrated into the inverter and which facilitates the utilization of usable insolation parts over the rated insolation of, for example, 1000 W/m², so far could not be used or only with substantial expenditures. It is assumed that during days with changing weather conditions the power consumption of the inverters could largely be covered. The efficiency of the inverters would be increased thereby. The yield of a solar plant would consequently be substantially improved.

FIG. 4 shows another modified embodiment of the invention with a particularly advantageous design of the storage component 35 or, respectively, the energy transfer path 36. It is pointed out however that, although a further embodiment is described, the configuration of the energy path 36 and the storage component 35 according to FIG. 4 could advantageously be used also in connection with the embodiments described with reference to FIGS. 1 and 3.

In the embodiment according to FIG. 4, the switching means for the activation of the energy transfer path 36 is part of DC/DC controller 39. The DC/DC controller 39 is in this case a bi-directional amplifier/reducer controller which includes two semi-conductor switches 47, 48 which are connected in series between the DC voltage branches 8, 9. Parallel to the lower switch 48 as shown in FIG. 4, between the connecting point of the switches 47, 48 and the negative DC voltage branch 9 a series circuit comprising a storage throttle 52 and a capacitor, in particular a super capacitor or similar, which forms the energy storage device 38 are connected.

When during operation an insolation peak occurs which is detected by means of the insolation sensor, which is not shown, or based on the full utilization of the inverter 4, the control component 34 of the additional arrangement 32 according to the invention activates the energy transfer path 36 by periodically switching the upper switch 47 of the DC/DC controller 39 shown in FIG. 4. The lower switch 48 is open. Upon closing of the switch 47, a current flows from the solar generator connection 6 via the switch 47, the storage throttle 52 to the capacitor 38 and charges the capacitor. When the switch 47 is opened, the by-pass current flows via the by-pass diode 51 of the lower switch 48. By the selection of a suitable switching ratio the desired energy amount is transferred to the condenser 38. This energy amount can be controlled by measuring the charging current to the capacitor 38 by means of a current measuring arrangement 53 and the voltage across the capacitor by means of a voltage measuring arrangement 54.

The embodiment according to FIG. 4 furthermore makes it possible to return energy from the energy store 38 to the inverter 4 in a particularly simple manner. This may occur supplemental to the solar generator 2 or alternatively. In any case, the control component 34 to this end switches the lower switch 48 with the respective frequency and the respective pattern depending on the desired amount of energy to be transferred while the upper switch 47 is open. When the switch 48 is closed, a current flows through the throttle 52 and the switch 48 back to the capacitor 38 whereas, in the open state of the switch 48 the by-pass current flows via the by-pass diode 49 of the upper switch 47 to the DC voltage branch 8 and on to the intermediate circuit 3 which here is assumed to be integrated with the inverter 4. Advantageously, almost all of the stored energy of the energy storage device 38 may be utilized because the capacitor 38 can be discharged almost to zero voltage.

Figure 5:
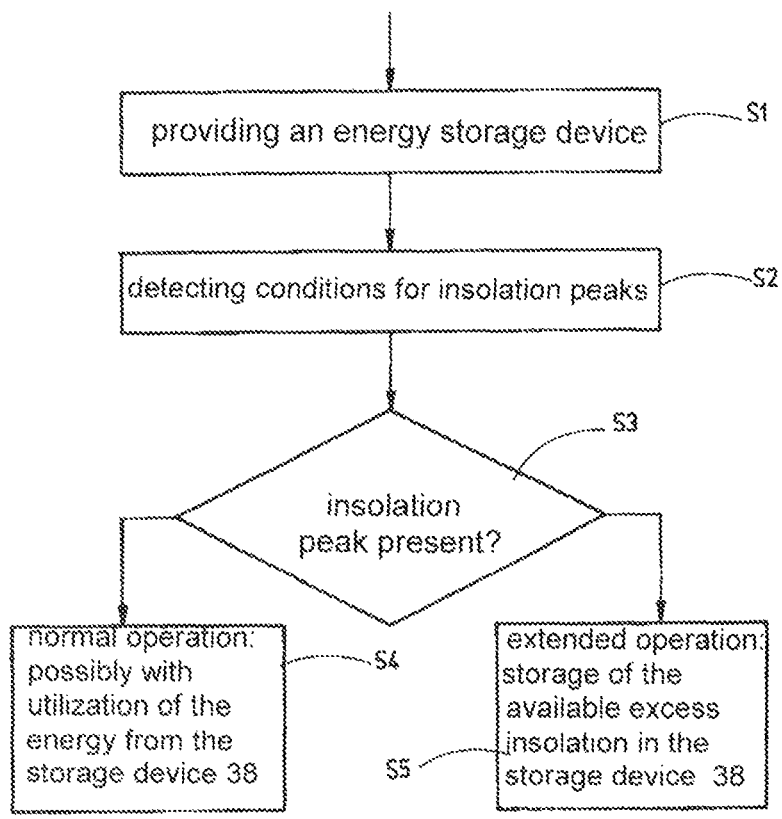

FIG. 5 illustrates a method according to the invention for operating an inverter system for a photovoltaic solar installation—such as, but not exclusively of, the inverter system 1 according to FIGS. 1 to 4—for generating an AC voltage from a DC voltage of a solar generator. In the step S1, in addition to the at least one storage device, a further energy storage device, for example, 38 is provided in the DC voltage intermediate circuit and is connected to the solar generator for receiving energy therefrom.

In the step S2, conditions are detected which are characteristic for the insolation conditions at the solar generator 2. For example, for this purpose the insolation energy is measured by the measuring device 33 directly at the solar generator. Alternatively, to this end, the desired energy value $P_{soll}$ as predetermined by the MPP-tracker arrangement 24 may be monitored. Also, other measuring arrangements or, respectively, methods at the AC voltage side as well as the DC voltage side of the inverter 4 may be taken into consideration in order to determine conditions for insolation peaks at the solar generator which exceed predeterminable maximum insolation energy generation or inverter output volume.

In step 3, it is examined whether the conditions for the insolation peaks at the solar generator are characteristic. To this end, the determined momentary value of the insolation energy can be compared with a predeterminable energy output reference value, for example, 1000 W/m² in order to determine whether the momentary insolation energy value exceeds the energy output reference value or can be examined whether the performance limit of the inverter has been reached.

If in step S3 the detected conditions indicate that there are no insolation peaks present at the solar generator, in step S4 the normal operation of the inverter system 1 is continued or established.

Otherwise, if conditions characterizing insolation peaks are detected in step S5 an extended operating mode is initiated wherein energy is transferred from the solar generator 2 to the energy storage device 38. The control 31 determines based on the momentary insolation energy value and the predetermined energy reference value or based on the desired energy output value or the maximum value of the output performance value of the inverter 4 which values are capable of parameterization, the limit energy amount which the inverter can feed, for example, into the AC voltage power supply network 21. Based hereon the control 31 further determines the energy amount which exceeds this energy limit and which accordingly is to be buffered in the energy storage device 38. Then the control 31 controls the energy transfer to the energy storage device 38 for the transfer of the previously determined amount of energy. The energy amount transferred can be monitored, for example, in the manner as illustrated in FIG. 4.

The steps S2 to S4 or, respectively, S5 are constantly repeated during operations of the inverter system.

As soon as the solar generator energy output drops below the rated generator output, the control 31 can initiate a return of energy from the energy storage device 38 back into the DC voltage intermediate circuit. In this way, the inverter 4 can further be operated at rated performance which increases the yield of the solar system. Alternatively, the energy from the energy storage device 38 may also be used for covering the energy consumption of the inverter 4 and/or that of secondary consumers.

Herewith, an inverter system 1 for a photovoltaic solar installation for generating an AC voltage from a DC voltage of a solar generator 2 is provided which includes an additional energy storage device 38 which is arranged in an energy transfer path 36 which is connected to the solar generator and which can be activated when needed. A control arrangement 31, 34 for monitoring and controlling the operation of the inverter system 1 is established for detecting short-term insolation peaks at the solar generator and activating the energy transfer path 36 for transferring energy from the solar generator 2 to the energy storage device 38 when insolation peaks are detected. In this way, the insolation excess energy can be preliminarily buffered during the short-term insolation peaks and later be utilized for covering the insolation peaks and later be utilized for covering the energy needs of the inverter 4 or for supplying energy to secondary consumers which increases the efficiency or yield of the solar system. Also a method of operating an inverter system for a photovoltaic solar installation so as to utilize insolation peaks at a solar generator is disclosed.

What is claimed is:

1. Inverter system for a photovoltaic solar installation for generating an AC voltage from a DC voltage of a solar generator, including:
    an intermediate circuit which comprises DC voltage branches which are connectable to the solar generator without interconnection of a DC/DC converter, and at least one storage device which is arranged between the DC voltage branches for interim storage of energy of the solar generator;
    an inverter connected to the intermediate circuit for converting an intermediate circuit DC voltage present between the DC voltage branches to an inverter output side AC voltage;
    a selectively activatable energy transfer path connected between the DC voltage branches;
    an energy storage device arranged in the energy transfer path for receiving and storing energy;
    a supervisory control arrangement for monitoring and controlling the operation of the inverter system, which includes a measuring arrangement for detecting a momentary insolation energy and supplying corresponding characteristic values to the supervisory control arrangement and the supervisory control arrangement includes a comparison arrangement for comparing the momentary insolation energy with a threshold value which is determinable as the limit value in order to determine whether insolation peak conditions are present, and if present, initiate an energy storage device, and wherein the supervisory control arrangement includes an MPP-tracker arrangement for adjusting the operating point of the solar generator for optimum power generation always such that the solar generator provides the highest possible power output available with the momentary insolation conditions and the supervisory control arrangement for setting the inverter to a voltage of the solar generator characteristic line which corresponds to the operating point of the solar generator with the momentary highest energy yield, said supervisory control arrangement for detecting at least one parameter which is characteristic of the momentary insolation energy at the solar generator and for evaluating it for a determination whether this parameter exceeds a predeterminable limit value for activating the energy transfer path for causing a transfer of energy from the solar generator to the energy storage device.

2. Inverter system according to claim 1, characterized in that inverter system is arranged for a one or multi-phase feeding of energy into an AC voltage power supply network, in particular a public power supply network.

3. Inverter system according to claim 1, characterized in that the inverter is a transformer-less inverter with periodically switchable semi-conductor switching elements arranged in a bridge circuit.

4. Inverter system according to claim 1, characterized in that the energy storage device is arranged for accommodating for a short period of about 5 to about 90 seconds up to about 50% of the rated performance of the inverter.

5. Inverter system according to claim 4, characterized in that the energy storage device includes at least one super capacitor.

6. Inverter system according to claim 1, characterized in that the energy storage device further includes a voltage converter for converting the voltage of the solar generator to a voltage level suitable for use in connection with the energy storage device.

7. Inverter system according to claim 1, characterized in that the energy transfer path includes a switching means which is activated or controlled by the control arrangement for selectively activating or deactivating the energy transfer path.

8. Inverter system according to claim 1, characterized in that the threshold value is an insolation value in the range of about 900 to about 1100 W/m$^2$.

9. Inverter system according to claim 1, characterized in that the limit value depends on the rated performance or on the maximum performance of the inverter.

10. Inverter system according to claim 1, characterized in that the supervisory control arrangement is arranged for recognizing a full load of the inverter by its output side maximum load and to then initiate an energy transfer to the energy storage device.

11. Inverter system according to claim 1, characterized in that the supervisory control arrangement includes the MPP-tracker arrangement for determining a desired power output for the inverter and a limiting arrangement for limiting the desired power output to a maximally admissible value and for initiating an energy transfer to the energy storage device, whenever the momentary desired power output value is larger than the maximally admissible value.

12. Inverter system according to claim 1, characterized in that the supervisory control system is arranged for determining based on parameters of the inverter system and/or momentary ambient conditions of the inverter system, the amount of energy to be buffered and for initiating the storing of energy according to the amount of energy determined.

13. Inverter system according to claim 1, characterized in that the supervisory control arrangement is arranged for causing the energy storage device to selectively transfer energy stored in the energy storage device the intermediate circuit or, respectively, a consumer.

14. Method for operating an inverter system for a photovoltaic solar installation for generating an AC voltage from a DC voltage of a solar generator, including an intermediate circuit which comprises DC voltage branches which is connected to the solar generator without interconnection of a DC/DC converter and includes at least one storage device which is arranged between the DC voltage branches for an interim storage of energy of the solar generator and an inverter connected to the intermediate circuit for the conversion of an intermediate circuit DC voltage between the DC voltage branches to an inverter output side AC voltage, a selectively activatable energy transfer path connected between the DC voltage branches;
- an energy storage device arranged in the energy transfer path for receiving and storing energy;
- a supervisory control arrangement for monitoring and controlling the operation of the inverter system, which includes a measuring arrangement for detecting the momentary insolation energy and supplying corresponding characteristic values to the supervisory control arrangement and the supervisory control arrangement includes a comparison arrangement for comparing the momentary insolation energy with a threshold value which is determinable as the limit value in order to determine whether insolation peak conditions are present, and if present, initiate the energy storage device, and wherein the supervisory control arrangement includes an MPP-tracker arrangement for adjusting the operating point of the solar generator for optimum power generation always such that the solar generator provides the highest possible power output available with the momentary insolation conditions and the supervisory control arrangement for setting the inverter to a voltage of the solar generator characteristic line which corresponds to the operating point of the solar generator with the momentary highest energy yield, said supervisory control arrangement for detecting at least one parameter which is characteristic of a momentary insolation energy at the solar generator and for evaluating it for a determination whether this parameter exceeds a predeterminable limit value for activating the energy transfer path for causing a transfer of energy from the solar generator to the energy storage device, wherein the method comprises the following steps:
- connecting the energy storage device to the solar generator for accommodating energy;
- detecting conditions which are characteristic for insolation conditions at the solar generator including detecting the momentary insolation energy level at the solar generator;
- determining the momentary desired power output of the inverter (4);
- comparing the momentary desired power out with a predeterminable power reference value the energy amount to be transferred to the energy storage device;
- controlling the energy transfer to the storage device in accordance with the determined energy amount to be transferred;
- adjusting the operation point of the solar generator always for optimum power generation such that the generator provides the highest possible power output available with the momentary insolation conditions,
- setting the inverter to a voltage of the solar generator characteristic line which corresponds to the operating point with the momentary highest energy yield,
- and in case the detected conditions characterize insolation peaks at the solar generator that exceed a predeterminable maximum insolation energy level initiating a controlled transfer of energy from the solar generator to the energy storage device for storing while the inverter is operated at its rated or maximum performance.

15. Method according to claim 14, characterized in that the method includes the following additional steps:
- determining the maximum power output of the inverter comparing the momentary desired power output with the maximum power output and in case the momentary desired power output exceeding the maximum power output, determining the energy amount to be transferred to the energy storage device on the basis of the desired energy output and the maximum energy output and controlling the transfer of energy to the energy storage device according to the energy amount to be transferred.

16. Method according to claim 14, characterized in that the method includes the following additional steps:
- comparing the momentary desired power output with the rated power output of the inverter and, in case, that the momentary desired power output is smaller than the control power output;
- connecting the energy storage device to the intermediate circuit and/or a consumer; and,
- controlling the energy transfer from the energy storage device to the intermediate circuit and/or a consumer.

* * * * *